(12) United States Patent
Brodeur

(10) Patent No.: US 6,765,188 B2
(45) Date of Patent: Jul. 20, 2004

(54) METHOD AND APPARATUS FOR CONVERTING THE OUTPUT OF A PHOTODETECTOR TO LOG VOLTAGE

(75) Inventor: Lester R. Brodeur, Hudson, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 266 days.

(21) Appl. No.: 10/038,064

(22) Filed: Jan. 4, 2002

(65) Prior Publication Data

US 2003/0174316 A1 Sep. 18, 2003

Related U.S. Application Data

(63) Continuation of application No. 09/302,745, filed on Apr. 30, 1999, now Pat. No. 6,495,816.

(51) Int. Cl.[7] .................................................. H01J 40/14
(52) U.S. Cl. .......................... 250/214 R; 250/214 LS; 250/214 LA
(58) Field of Search ................... 250/214 R, 214 LS, 250/214 LA; 356/223

(56) References Cited

U.S. PATENT DOCUMENTS 6,495,816 B1 * 12/2002 Brodeur ................. 250/214 R

FOREIGN PATENT DOCUMENTS

JP          405180695 A   *   7/1993

* cited by examiner

*Primary Examiner*—Zandra V. Smith
(74) *Attorney, Agent, or Firm*—Bourque & Associates, P.A.

(57) ABSTRACT

In a video receiver, a photodiode is terminated with one or more junction diodes to provide an output voltage that is a log function of the incident optical power. The termination with the diode provides a nonlinear resistance which converts the output current of the photodiode to a voltage, with the output voltage being the log of the input current due to the nonlinear resistance characteristic associated with junction diodes. The subject system eliminates the necessity of providing a transimpedance amplifier used to obtain a voltage from the photo current of a photodetector and also the requirements for a log amplifier to provide the log of the voltage to give the receiver a wide dynamic range. In one embodiment a PIN diode is provided with a series of termination diodes, with the larger of the number of diodes, the more voltage that is available. The series-connected termination diodes provide a passive low noise system for converting the photo current to a log voltage.

7 Claims, 4 Drawing Sheets

V = diode terminal voltage
ln = natural log
I = diode current
Ir = reverse diode current Photo Current to voltage conversion with resistive load Photo Current to Voltage conversion with inverting or transimpedance amplifer Photo Current to Log Voltage conversion

METHOD AND APPARATUS FOR CONVERTING THE OUTPUT OF A PHOTODETECTOR TO LOG VOLTAGE

CROSS-REFERENCE TO RELATED APPLICATIONS

This application is a continuation of U.S. patent application Ser. No. 09/302,745, filed Apr. 30, 1999, now U.S. Pat. No. 6,495,816.

TECHNICAL FIELD

The present invention relates to photodectors and more particularly, to an arrangement of diodes places at the output of a photodetector to convert the photo current to a log voltage without the utilization of resistors, transimpedance amplifiers and log amplifiers.

BACKGROUND INFORMATION

In one application it is very important for the output of a photodetector to have a very wide dynamic range, while at the same time responding to laser pulses in a ten nanosecond region. As is common in the detection of underwater mines, a laser illuminator is pointed down towards the surface of the ocean or other body of water and the returns from subsurface objects such as mines are then detected to determine the presence of such objects. Typically a mine is on the order of a few feet in diameter and it is only with difficulty that these subsurface mines can be detected at all.

In the past it has been the practice to provide many channels of information to a processor in a video receiver in order to interpret the laser returns from the reflection of subsurface objects. Since the objects in question are only a few feet in diameter, the laser pulses of equivalently short length are utilized. A short laser pulse is utilized to limit the amount of water excited to reduce light diffusion and to be able to detect these small targets.

Not only are laser pulses of necessity relatively short, it will be appreciated that one would expect strong returns from a mine which is only a few feet below the surface of the water, and extremely weak returns from mines at greater depths.

The problem of detecting mines at unknown depths is that while a relatively large signal is returned from shallow mines, the signals from deep mine are weak due to the attenuation of the laser pulse as it passes through the water.

What is therefore required is a detector which has a relatively wide bandwidth to be able to detect short pulses, while at the same time having a dynamic range which covers returns not only from shallow mines, but also from the deep ones as well.

In the past, the video receivers utilized in this application incorporate a photodetector coupled to a transimpedance amplifier to convert the output current of the photodetector to a voltage. Therefore, the putout of the transimpedance amplifier is coupled to a log amplifier which has an output which is the log of the input voltage. Thus the log amplifier provides dynamic range extension by compressing the input signal range for subsequent analog-to-digital conversion.

The problem with such a configuration is that while it does in fact achieve a log output, the log amplifier has a low bandwidth, which in the best of circumstances is not more than a 100 MHz. Additionally, log amplifiers dissipate large amounts of power, and have a somewhat limited dynamic range. Moreover, there is a high noise floor associated with such an arrangement, making the detection of weak signals from deeper mines difficult.

Conventionally, photodetectors are provided with a shunt resister to ground to convert the photo current to voltage. While the advantage of such as system is that it is passive and is small in size, this arrangement has a low bandwidth. Moreover, the resistor termination method results in a high output impedance and an exceptionally high noise floor. Additionally, there is of course no logarithmic relationship of the output voltage to the input current, which is not useful in the above noted in the application.

As mentioned hereinbefore, it is possible to convert photo current to a voltage with an inverting or transimpedance amplifier which has the advantage of a low output impedance, but the disadvantage of a low bandwidth, coupled with high power dissipation and a high noise floor. As a result, prior approaches to the provision n a suitable video receiver have been inadequate.

SUMMARY

In order to provide adequate dynamic range as well as logarithmically related output signals for the detection of very short LIDAR pulses, in the subject system the photodiode output is provided with a series of junction diodes connected between the photodiode output and ground. The result of such a termination scheme is that the output of the photodetector is immediately converted to a log voltage. The reason is that the junction diode acts as a nonlinear resistor which compresses the signal. The non-linearity of the resistance provided by the diode is a log function in which the input current is compresses by this nonlinear resistive function. Thus the output voltage is the log of the input current.

The resulting detector has a wide bandwidth utilizing passive, small size components. Moreover the subject system provides a low output impedance with a full dynamic range and low noise. The dynamic range of the subject system may be increased by increasing the number of series-connected diodes between the output of the photodiode and the ground.

In one embodiment a PIN photodiode is utilized, which produces reversed current in response to incident light. The PIN diode may be reverse biased to improve its quantum efficiency. The amount of current produced as a function of incident light is in terms of amps/watt. The photodiode acts as nearly an ideal current source especially when substantial reverse biases are supplied to the diode. When the output of the photodiode is terminated by one or more series connected junction diodes, then the classical junction diode equation which relates the junction diode terminal voltage to its current is one of a logarithmic nature. Thus, the utilization of a junction diode provides a logarithmically related output voltage.

Since the temperature dependence of the diode amplitude response is exactly that of a junction diode, a reference junction diode can be used to compensate the output voltage so as to normalize against temperature variation.

Further, the subject diode termination scheme allows the PIN photodiode to dominate the noise floor and thus provide a low additive noise factor in the conversion of photodiode current to log voltage.

It is noted that noise in both the photodiode and the termination diode is composed of two components namely the Thermal Johnson Noise and the Generation/Recombination, GR, Noise. The GR noise is proportional to the rate and number of electron/hole pair generations. Recombinations which will always be greater in the PIN diode due to the presence of the large intrinsic region. Thermal noise is proportional to the effective junction area and temperature. For a given temperature, the PIN diode will exhibit greater thermal noise due to its intrinsic region. Therefore, the termination diode noise will be less than that of the photodetector for any practical number of termination diodes.

Additionally, the inherent photodetector bandwidth is on the order of a hundred megahertz. This is limited by the minority carrier lifetime of the PIN diode as well as its output capacity, generally a few picofarads.

As mentioned hereinbefore, other conventional signal conversion methods severely limit the inherent detector bandwidth. Schemes involving active amplifiers or log amplifiers push the overall bandwidth below 100 megahertz. Additionally for large signals, these amplifiers impose slew rate limitations that are even more restrictive. The diode termination method described hereinabove has no slew rate limitation.

Also, additional series-connected termination diodes increase the output voltage for a given incident light level by N, where N is the number of diodes. The desired signal level is additive and the diode junction noise increases as the square root of N. Therefore, the signal noise ratio for the diode termination string improves in proportion to N.

It will also be appreciated that the overall termination string capacitance decreases in proportion to I/N, this acts to improve the bandwidth as more diodes are added.

What is accomplished by the termination of the output of a photodetector with junction diodes is to provide dynamic range compression, while preserving a wide bandwidth. This is accomplished without the cost and space burden of active amplifiers and the accompanying high power dissipation. Additionally, the subject eliminates the problem of high noise floors associated with the above approaches.

BRIEF DESCRIPTION OF THE DRAWINGS

These and other features of the subject invention will be better understood in connection with the Detailed Description in conjunction with the Drawings of which.

DETAILED DESCRIPTION OF THE PREFERRED EMBODIMENTS

Figure 1:
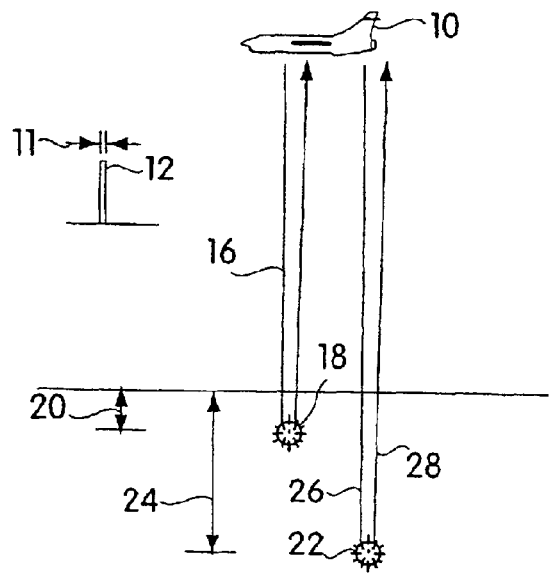
FIG. 1 is a diagrammatic illustration of the location of underwater mines through the utilization of a LADAR system in which an ultrashort laser pulse is directed towards the surface of the ocean and at which returns from a mine are detected.

Referring now to FIG. 1, a scenario is depicted in which an overflying aircraft 10 projects laser pulses 12 down towards the surface 14 of a body of water, in which the direction of the laser beam is shown by arrow 16. If there is a mine 18 which is close to the surface as illustrates by double-ended arrow 20, then the returns from this mine are indeed quite strong since there is virtually no attenuation, for instance for the first 5 feet of depth.

On the other hand, for deeper mines 22 as illustrated by double-ended arrow 24 at greater depths, then the laser beam 26 is highly attenuated by the time that it reaches mine 22. Thereafter the return as illustrated at 28 is likewise heavily attenuated as it passes through the same water volume on its was to surface 14 and thence towards aircraft 10.

What is depicted is a scenario in which there is a large dynamic range associated with the laser returns. In terms of incident power in a detector, the difference in amplitude of the returns from a shallow mine and a deep mine are several orders of magnitude.

Moreover, since mines are themselves relatively small objects, in order to be able to detect the presence of a mine with sufficient resolution, very short laser pulses are necessary.

Figure 2:
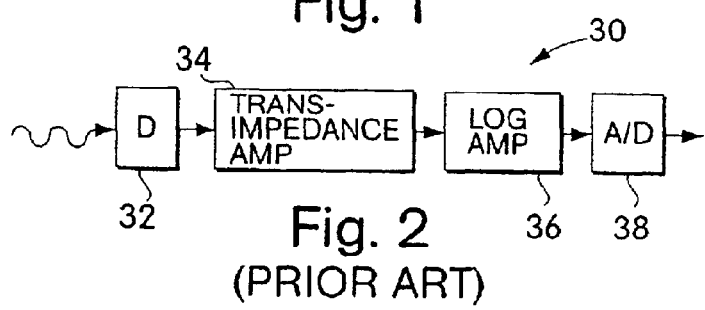
FIG. 2 is a block diagram of prior art detector coupled to a transimpedance amplifier for converting photo current to voltage, which is in turn coupled to a log amplifier for converting the output of the transimpedance amplifier to the log of the voltage, from whence the output is coupled to an analog-to-digital converter for the provision of an output having a wide dynamic range able to accommodate the returns from both shallow and deep mines.

Typically, and as shown in FIG. 2, a video receiver 30 includes a photodetector 32 coupled to a transimpedance or inverting amplifier 34, which is turn is coupled to a log amplifier 36. The output of the log amplifier is typically converted to a digital signal by an analog-to-digital converter 38 for further processing by the video receiver.

As mentioned hereinbefore, while the system of FIG. 2 does in fact produce a log output, there is an exceptionally low bandwidth due to the low bandwidth of the transimpedance amplifier as well as the relatively low bandwidth of the log amplifier normally utilized. Thus in the prior art it is only with difficulty that one can achieve the bandwidth. Moreover, the power dissipation through the utilization of a transimpedance amplifier and a log amplifier is high. Additionally, dynamic range is limited due to the fact that the dynamic range is the log amplifier can in no way duplicate the dynamic range is the detector. Finally, there is a high noise floor associated with such a system.

Figure 3:
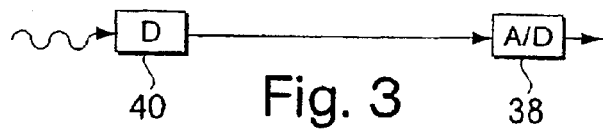
FIG. 3 is a block diagram of the subject system illustrating a photo detector coupled directly to an analog-to-digital converter, thereby eliminating the necessity of the transimpedance amplifier and the log amplifier associated with the system of FIG. 2, also eliminating the problems inherent with transimpedance and log amplifiers.

In contradiction to these prior art systems as illustrated in FIG. 3, a passive photodetector system 40 has its output directly coupled to analog-to-digital converter 38, thereby completely eliminating not only the transimpedance amplifier but also the log amplifier, along with the inherent limitations of both of these devices.

Photodetector system 40 is one in which the output of a photodetector has one or more junction diodes which terminate its output and are in series to ground. The purpose of the termination diodes is to provide that the output of the photodetector be voltage, and that this voltage be proportional to the log of the photo current when pulsed returns are incident on the photodetector.

Here a PIN photodetector 42 is terminated with junction diodes 44 and 46 which are connected between output 48 and ground. As will be explained, the voltage out is the log of the ratio of the diode current to the reverse diode current +1 times a thermal voltage coefficient.

Figure 5:
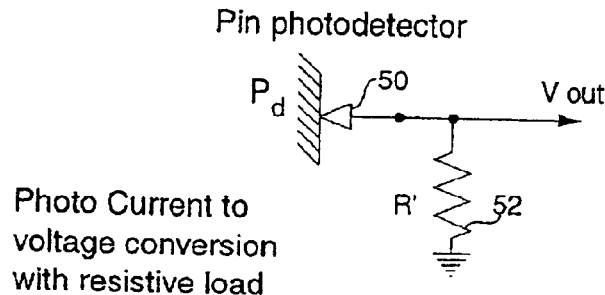
FIG. 5 is a schematic diagram of a prior art photo current to voltage conversion system utilizing a resistive load.

Referring now to FIG. 5, in one prior art system a load is utilized to terminate a photodetector. Here photodetector 50 is terminates with a resistive load 52. The advantages of such a system are that the system is completely passive and is of small size. The disadvantages are that this system has an exceedingly low bandwidth, a high output impedance and a high noise floor. Moreover, the dynamic range is not logarithmic.

Figure 6:
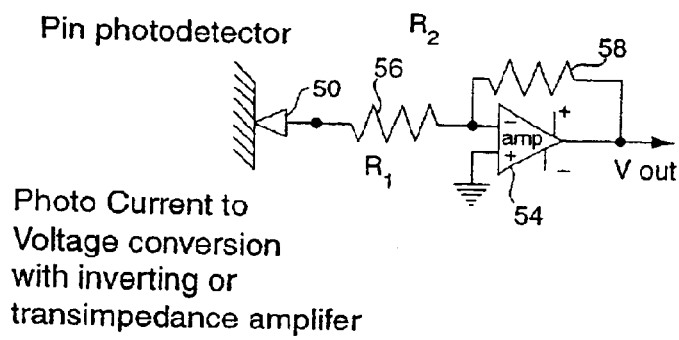
FIG. 6 is a schematic diagram of a prior art photo current to voltage system utilizing an inverting or transimpedance amplifier.

Referring now to FIG. 6, in an effort to improve upon the situation with respect to the system of FIG. 5, photodetector 50 is provided with a transimpedance amplifier 54 having its positive input grounded and its negative input coupled through a resistor 56 having a value $R_1$ coupled to its negative input. A feedback resistor having a value of $R_2$ is coupled between the output of amplifier 54 and its input.

The result of doing so is a low output impedance output which is advantageous. However, disadvantages are the low bandwidth associated with the transimpedance amplifier, high power dissipation and high noise floor.

Figure 7:
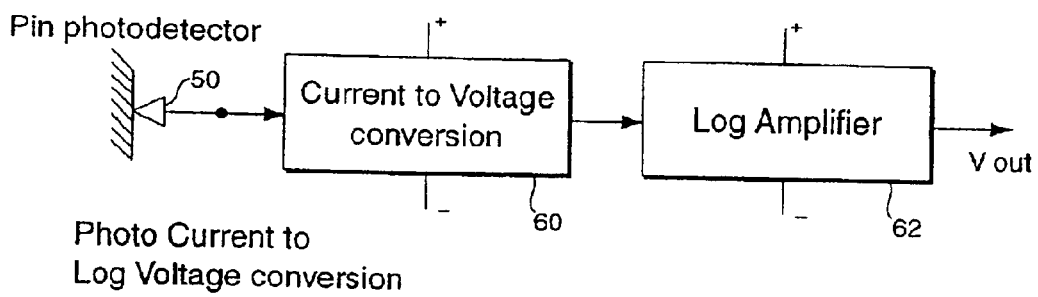
FIG. 7 is a schematic diagram of a prior art photo current to log voltage conversion system utilizing an inverting or transimpedance amplifier coupled to a log amplifier.

Referring now to FIG. 7, a photodetector 50 is coupled to a current to voltage conversion stage 60 which may be of the variety illustrated in connection with FIG. 6. The output of the current-to-voltage conversion section is applied to the input of a log amplifier 62 which outputs the log of the photo current.

The advantage of such a system is the log output. However, the disadvantages include low bandwidth associated both with the log amplifier and the current-to-voltage conversion system, high power dissipation, limited dynamic range due to the limitations of the log amplifier and also a high noise floor.

Figure 4:
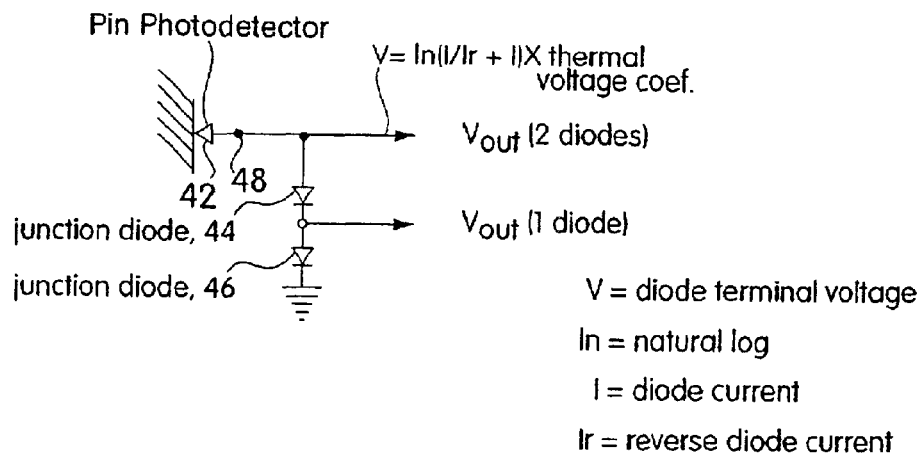
FIG. 4 is a schematic diagram of the subject photo detection system showing the output of a photodetector terminated by series-connected junction diodes to ground, with the output of the photodetector being converted to a voltage which is the log of the ratio of diode current to reverse diode current +1 times the thermal voltage coefficient of the diodes.

More particularly, in the subject system a photodiode is terminated by one or more series connected junction diodes. FIG. 4 shows two type 1N4154 terminating diodes. The 1N4154 is a silicon epitaxial Planar Diode with 4 pf junction capacity and 2 ns reverse recovery time. The diode choice is not particularly crucial. However, is should be a small signal high speed diode. One could use a Schottky device. The classical, junction, diode equation relates the junction diode terminal voltage to it's current as:

$$I=I_r(e^{qV/nkT}-1)$$

where
    I is the diode current in amps
    $I_r$ is the diode reverse current (doubles each 10° C.)
    e is the natural exponent base (2.718 . . . )
    q is electron charge ($1.6\times10^{-19}$ coulombs)
    V is the diode terminal voltage in volts
    n is a doping related constant that caries from 1 to 2.
    k is Boltzmann's constant ($8.61\times10^{-5}$ eV/K)
    T is temperature in degrees Kelvin The thermal voltage coefficient kT/q is 0.0236 volts at room temperature (300 degrees Kelvin). Therefore at 25 degrees Centigrade one can rewrite the diode equation as:

$$I=I_r(e^{V/0.026}-1) \text{ or } I/I_r+1=e^{V/0.026} \text{ or, } V/0.026=\ln(I/I_r+1)$$

then $V=(\ln(I/I_r+1))\times 0.026$ where ln is natural log
The output voltage as a function of Photo Diode incident optical power with one terminating diode of the 1N4154 type (1 pa $I_r$ is:

$$V=(\ln S/1e{-12}+1)\times 0.026$$

Figure 9:
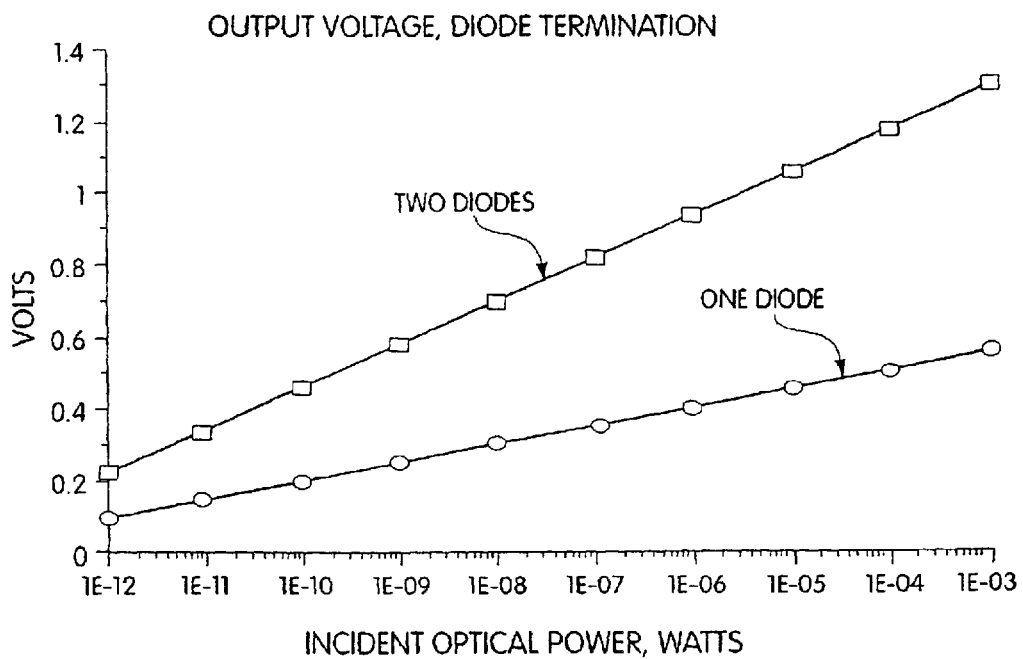
FIG. 9 is a logarithmic graph of incident optical power versus voltage for the subject system indicating the results for a one diode termination and a two diode termination showing a wide dynamic range.

As a practical example, taking incident optical power of 1 pW to 1 uW on an Advanced Photonics Incorporated avalanche photodiode with S=75 amps/watt, the output voltage for this optical power range is given by the plot of FIG. 9 is a plot of the preceding equation. This graph gives the theoretical output voltage for one diode and two diodes. For N diodes simply multiply the one (1) diode response amplitude by N.

Figure 8:
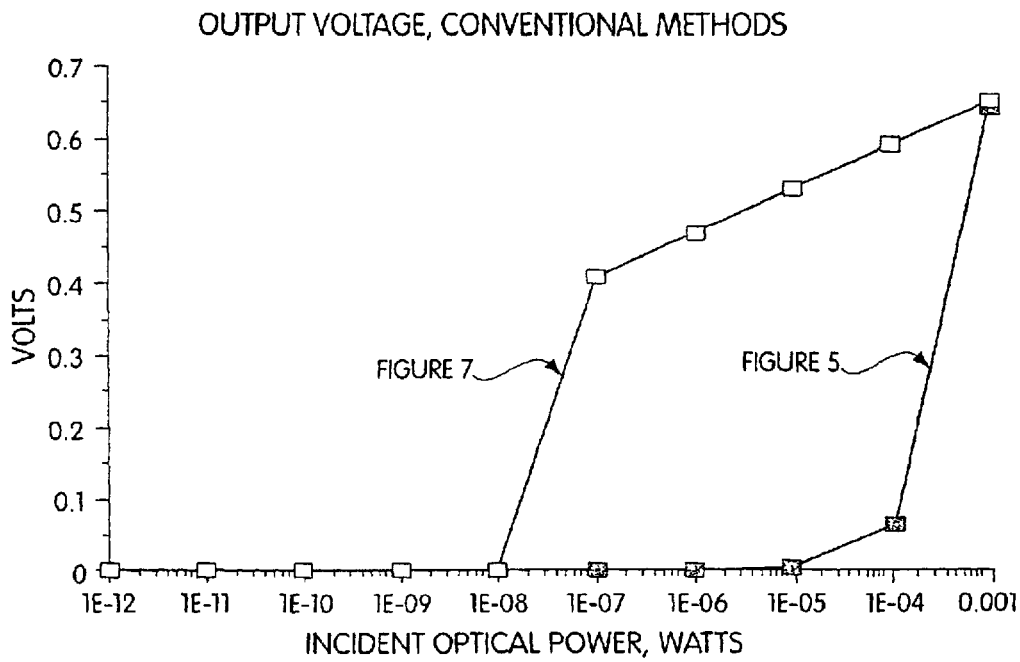
FIG. 8 is a logarithmic graph of incident optical power versus voltage for the photo detection systems of FIGS. 5 and 7 showing the bandwidth limitations due to the resistive termination of the circuit of FIG. 5 and the bandwidth limitations of the log amplifier of FIG. 7, along with a limitation in the dynamic range due to the utilization of a log amplifier which has many orders of magnitude less dynamic range that that of the photodiode.

FIG. 8 is a plot of the output voltage for the linear circuits for FIGS. 5 and 6 and the conventional log implementation of FIG. 7. A comparison of the plots of FIGS. 8 and 9 emphasizes the necessity to take the log of photodiode current if dynamic range is an issue. However the classical means of taking the log is dynamic range limited and bandwidth limiting, compared to the subject junction diode termination method. Also the classical approach requires more space, exhibits an elevated noise floor ands produces undesirable heat dissipation compared to the passive diode termination.

Figure 10:
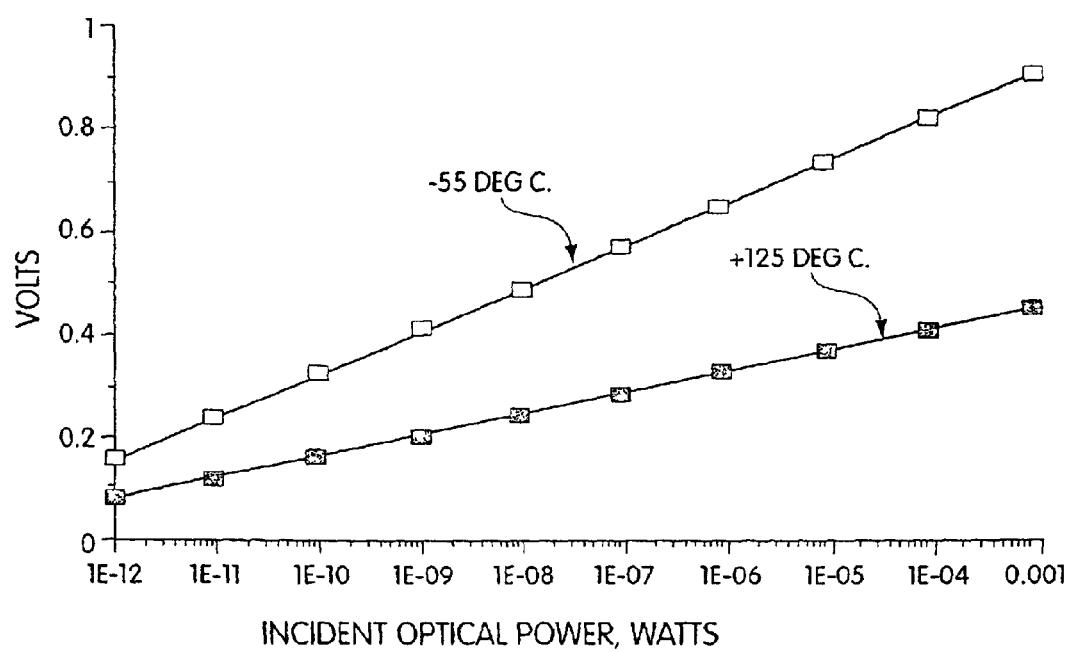
FIG. 10 is a logarithmic graph showing a graph of the incident power versus voltage for two different temperatures in which the diode amplitude response over the two temperatures is graphed.

As to temperature, FIG. 10 shows the diode amplitude response over temperature, −55° C. to +125° C. Since this temperature dependence is exactly that of a diode junction, a reference junction diode can be used to compensate the output voltage so as to normalize against temperature variation. Actually the photodiode is often temperature stabilized with a localized thermo-electric cooler to improve the noise floor and to remove its own temperature dependence on responsivity. In this case, the termination diode can be mounted on or near the photodiode substrate to enjoy the same thermo-electric cooler. This normalizes the termination diode temperature and produces a sensor terminal voltage that is not temperature dependent.

With respect to noise floor of the subject system, only the diode termination scheme allows the PIN photodiode to dominate the noise floor and thus provide a 0 dB additive noise factor tin the conversion of photodiode current to log voltage. The resistive termination can for low resistance values produce a noise level that is lower than the PIN diode; but, such low values would not generally produce usable voltage levels and log response is not possible.

As stated above, noise in both the photodiode and the termination diode is composed two components; thermal (Johnson) noise and Generation-Recombination (Gr) noise. Gr is proportional to the rate and number of electron-hole pair generations and recombinations which will always be greater in the PIN due to the presence of the large intrinsic region. Thermal noise is proportional to the effective junction area and temperature. For a given temperature the PIN diode will again exhibit greater thermal noise due to its intrinsic region. Therefore, the termination diode noise will always be less than that of the photodiode detector for any practical number N.

As to bandwidth, the inherent photodiode detector bandwidth is on the order of hundreds of megahertz and is limited by the minority carrier lifetime of the PIN diode as well as its output capacity, generally a few picofarads. The degradation in bandwidth experienced by adding the termination diodes is very slight since termination diodes with as little as 1.5 pf are readily available with shorter minority carrier life times than that of the PIN diode.

As mentioned above, the other conventional signal conversion methods severely limit the inherent detector bandwidth. Schemes involving active amplifiers and/or log amplifiers push the overall bandwidth below 100 megahertz for small signals. Additionally, for large signals they impose slew rate limitations that are even more restrictive. The diode termination method has no slew rate limitation.

With respect to the stacking of termination diodes, adding additional series connected termination diodes increases the output voltage for a given incident light level by N where N is the number of diodes. The desired signal level is additive and the diode junction noise increases as the square root of N. Therefore the signal/noise ratio for the diode termination string improves in proportion to N. However, this improvement is not one that is very useful since the overall signal/noise ratio is dominated by the PIN diode noise which is contained in the signal portion of the termination diode current. This does mean, however, that adding diodes to the termination string does not reduce the inherent PIN diode signal to noise ratio nor does it increase the overall conversion noise factor.

The overall termination string capacitance decreases in proportion to I/N. This is another factor in the subject system which acts to improve the bandwidth as more diodes are added. However the overall conversion bandwidth is limited by that of the PIN photodiode detector which is nearly achieved with even one termination diode.

Performance Parameters

Derived performance parameters for diode terminated PIN and APD photo-sensors for 1 and 3 series termination diodes of either Minority carrier or Majority carrier types, is shown below in Table 1:

TABLE 1

| Signal Current | Output Voltage* | Trans-impedance gain (V/A) | Minimum Load R in Ohms | Minimum Pulse Width** | Full time 100% to 90% | Full time 100% to 80% |
|---|---|---|---|---|---|---|
| 1 Diode of Type 1N5711 Majority Carrier (Schottky) | | | | | | |
| 100 na | 55 mv | 550 K | 550 K | 10 us | 350 ns | 790 ns |
| 1 ua | 132 mv | 132 K | 132 K | 2 us | 112 ns | 260 ns |
| 10 ua | 212 mv | 21 K | 21 K | 550 ns | 20 ns | 70 ns |
| 100 ua | 294 mv | 3 K | 3 K | 35 ns | 8 ns | 13 ns |
| 1 ma | 390 mv | 390 | 390 | 5 ns | 7 ns | 8 ns |
| 3 Diodes of Type 1N5711 | | | | | | |
| 100 na | 166 mv | 1.6 M | 1.6 M | 25 us | 1 ns | 2.5 ns |
| 1 ua | 394 mv | 394 K | 394 K | 5 us | 270 ns | 650 ns |
| 10 ua | 640 mv | 64 K | 64 K | 500 ns | 55 ns | 140 ns |
| 100 ua | 883 mv | 8.8 K | 8.8 K | 75 ns | 7 ns | 1325 ns |
| 1 ma | 1.17 mv | 1.3 K | 1.3 K | 10 ns | 2.7 ns | 5.4 ns |
| 1 Diode of Type 1N4148 Minority Carrier (Abrupt Junction) | | | | | | |
| 100 na | 160 mv | 1.6 M | 1.6 M | 30 us | 1.5 us | 4 ns |
| 1 ua | 270 mv | 270 K | 270 K | 4 us | 1380 ns | 850 ns |
| 10 ua | 380 mv | 38 K | 38 K | 500 ns | 80 ns | 230 ns |
| 100 ua | 495 mv | 5 K | 5 K | 75 ns | 27 ns | 60 ns |
| 1 ma | 604 mv | 604 | 604 | 25 ns | 23 ns | 42 ns |
| 3 Diodes of Type 1N4148 | | | | | | |
| 100 na | 458 mv | 4.5 M | 4.5 M | 50 us | 4.3 us | 9.5 us |
| 1 ua | 805 mv | 805 K | 805 K | 8 us | 800 ns | 2.1 us |
| 10 ua | 1.14 V | 114 K | 114 K | 1 us | 150 ns | 440 ns |
| 100 ua | 1.48 V | 14.8 K | 14.8 K | 200 ns | 30 ns | 175 ns |
| 1 ma | 1.81 V | 1.8 K | 1.8 K | 40 ns | 21 na | 45 ns |

*no load voltage, multiply by 0.707 when loaded with indicated min load value
**minimum pulse width to achieve 99% of final value To use these tables, if one diode of the 1N5711 type is to be used to compress four orders of magnitude (100 nanoamps to 1 milliamp) referring to the first table, one can expect the output voltage to range from 55 millivolts to 390 millivolts which is less than one order of magnitude. A minimum pulse width of 10 microseconds would be required and the resistive load must be greater than 550 K ohms. If the minimum signal level were to be 1 microamp then the minimum pulse width would be 2 microseconds and the load resistance would be no less than 132 K ohms.

If the diode termination is placed on the photo-detector substrate no pin-out modification to the standard package is necessary. It should be noted that the log voltage output sensor can still be used as a conventional current source output, such as to an external conventional transimpedance amplifier. Since in the conventional current output mode the load resistance will be very low, the shunt diode termination will have no effect on the conventional utilization.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of on of ordinary skill in the art and are contemplated as falling within the scope of the invention as limited only by the appended claims and equivalents thereto.

Modifications and substitutions by one of ordinary skill in the art are considered to be within the scope of the present invention, which is not to be limited except by the following claims.

The invention claimed is:

1. Apparatus for converting the output of a photodiode to a log function, comprising:
    a photodiode having output providing a current proportional to incident optical energy; and,
    a junction diode coupled between said output and ground, whereby the current representing the incident energy is converted to a log voltage, with the termination of said output with said junction diode providing said log voltage.

2. The apparatus of claims 1, and further including an additional junction diode connected between the output of said first mentioned junction diode and ground, whereby the output voltage obtainable at said output is multiplied by the number of diodes connected between said output and ground.

3. The apparatus of claim 1, wherein said photodiode is a PIN diode.

4. A method for providing high dynamic range and increased bandwidth to a photodetector circuit in which a photodetector provides as an output a current proportional to the power of radiation incident thereon, comprising the act of:
    providing the output of the photodetector with a diode termination to ground, and whereby the output of the photodetector is a log voltage proportional to the power of the incident radiation.

5. The method of claim 4 further including the acts of:
    projecting an ultrashort laser pulse towards a sea surface;
    detecting returns reflected by subsea objects at a position above the sea surface; and,
    wherein said output current from said photodetector is converted to a log voltage to permit detection of said subsea objects.

6. The method of claim 5, wherein said photodetector includes a PIN number.

7. The method of claim 5, and further including an additional junction diode connected in series with the first mentioned diode to ground for increasing the voltage at the output of the photodiode.

* * * * *